United States Patent [19]

Duke

[11] 4,396,530

[45] Aug. 2, 1983

[54] MINERAL ACID DEMULSIFICATION OF SURFACTANT-CONTAINING EMULSION

[75] Inventor: Roy B. Duke, Littleton, Colo.

[73] Assignee: Marathon Oil Company, Findlay, Ohio

[21] Appl. No.: 272,453

[22] Filed: Jun. 11, 1981

[51] Int. Cl.$^3$ ............................................. B01D 17/04
[52] U.S. Cl. .................................... 252/329; 252/330; 252/331; 252/344; 252/358
[58] Field of Search ............... 252/329, 330, 331, 344, 252/358, 8.55 D

[56] References Cited

U.S. PATENT DOCUMENTS

| | | | |
|---|---|---|---|
| 1,467,831 | 9/1923 | Barnickel | 217/124 |
| 2,209,445 | 7/1940 | de Mering | 252/333 |
| 2,214,783 | 9/1940 | Wayne | 252/332 |
| 2,216,310 | 10/1940 | Blair, Jr. | 260/404 |
| 2,269,134 | 1/1942 | Tarnoski | 252/335 |
| 2,447,530 | 8/1948 | Perkins, Jr. | 204/190 |
| 4,089,803 | 5/1978 | Bessler | 252/344 |
| 4,183,820 | 1/1980 | Theile et al. | 252/342 |

FOREIGN PATENT DOCUMENTS 840485 7/1976 Belgium .
1540719 2/1979 United Kingdom .

OTHER PUBLICATIONS

Becher, Paul, *Emulsions: Theory and Practice,* (Sec. Ed.), Chpt. 9, Reinhold Pub. Corp. (1965).
Shashkin, *Vostochnaya Neft,* No. 5-6, p. 55 (1940).

*Primary Examiner*—Richard D. Lovering
*Attorney, Agent, or Firm*—Jack L. Hummel

[57] ABSTRACT

Oil is recovered simultaneously from all phases of a surfactant-produced crude oil or simultaneously from the middle and upper phases of such an emulsion by acidizing the emulsion with a mineral acid, preferably nitric acid. Following the acidation step, the oil is rendered relatively noncorrosive by the use of a neutralization step which incorporates a demulsifier to prevent the reformation of subsequent emulsions. Polyalkyloxyamines are particularly useful as both neutralizers and demulsifiers. The process of the present invention is useful in the demulsification of crude oil emulsions produced by surfactant floods utilized in secondary and tertiary oil recovery techniques. The invention is particularly beneficial in the treatment of such emulsions produced by micellar or micellar-polymer flooding of oil reservoirs.

11 Claims, 1 Drawing Figure

MINERAL ACID DEMULSIFICATION OF SURFACTANT-CONTAINING EMULSION

TECHNICAL FIELD

This invention relates to a means for the simultaneous demulsification of all of the emulsion phases of a surfactant-containing crude oil emulsion through the use of a mineral acid, particularly nitric acid. It further relates to a means for washing the resulting oil to reduce its acidity without causing the reformation of an emulsion.

BACKGROUND ART

Due to the gradually declining production of crude oil in the U.S.A., a number of enhanced oil recovery (EOR) projects have been undertaken to stimulate production from known oil fields that are beyond their economic recovery limits. One of these EOR methods inject their surfactant into the reservoir which lowers the oil-brine interfacial tension and allows more oil to be produced. Such processes are commonly known as surfactant, surfactant-polymer, micellar, micellar-polymer floods.

Although the surfactant flooding systems have proved successful in recovering additional oil, they have also introduced problems which have heretofore not been encountered. Foremost among these is that the produced oil is an emulsion caused by the surfactants, cosurfactants and polymers used in surfactant floods utilized in secondary and tertiary recovery processes for oil.

Fluids produced by the flooding of an oil reservoir with a surfactant flood generally consist of three phases each of which is an emulsion comprised of surfactant, brine and oil. The amounts of the three phases, relative to one another, change throughout the course of the flood. For example, with respect to a micellar-polymer flood, at the height of oil production, the relative amounts of the three phases might characteristically be:

Upper phase 13±5%
Middle phase 2±2%
Lower phase 87±7%

The upper-phase emulsion (UPE) consists largely of oil and is stabilized by oil-soluble surfactants. It can contain as much as 12% water and surfactants; however, this total is generally less than about 5%.

The middle-phase emulsion (MPE) is a mixture of about equal quantities of oil and brine. It is stabilized by divalent ion sulfonates and the polymer, e.g., polyacrylamide, used for mobility control of the flood.

The lower-phase emulsion (LPE) is largely brine. It is stabilized by water-soluble surfactants and also contains salts. Additionally, it may contain as much as 5% oil in addition to a water-soluble polymer. The UPE is a water-in-oil microemulsion; the LPE is an oil-in-water microemulsion; and the MPE is a macroemulsion.

The three emulsion phases can be separated by allowing the produced fluids to stand quiescently. If acceleration rates are desired, demulsifiers may be added or the fluids can be centrifuged. The addition of economically attractive amounts of demulsifiers, i.e., less than about 0.5 percent by weight based on the weight of the oil, do not significantly alter the volumes of the compositions of the three emulsion phases from comparable values obtained by quiescent standing in the absence of demulsifiers.

Therefore, due to the diverse natures of the three emulsion phases, no single demulsifier or combination of the emulsifiers has been discovered which will demulsify all three phases simultaneously or even the upper and middle phases simultaneously. In fact, it is not uncommon to find that emulsifiers behave antagonistically toward toward one another. For example, a particular demulsifier may excel in separating and oil-in-water emulsion, but when added to an oil-in-water emulsion, it may have the opposite effect and aid in stabilizing the emulsion. Moreover, generally attempts to demulsify both the upper phase and middle phases of a surfactant produced crude oil require large amounts of conventional nonionic surfactants which may cause the middle phase to be dissolved in the oil to yield a two phase system. This is of no benefit to subsequent processing of the oil, since the middle phase emulsion and the oil must eventually be separated. In short, none of the prior art demulsifiers, which are usually nonionic demulsifiers, are useful in the simultaneous demulsification of all three phases nor are any of them known for their ability to demulsify the middle phase emulsion.

U.S. Pat. No. 4,089,803 is representative of conventional type demulsifiers. It discloses a demulsifier consisting of a mixture of an oxyalkylated phenol-aldehyde resin, a polyethylene amine and an alkanol amine. The oxyalkylated phenol-aldehyde resin may be a phenol-formaldehyde polymer which has been subsequently reacted with ethylene oxide to achieve the desired degree of ethoxylation. The polyethylene amine may be pentaethylene hexamine, and the alkanol amine may be triethanol amine. Demulsifiers of this type have been marketed under the tradenames Tretolite P-453 and Tretolite RP-578.

Prior Art Statement

Lowering the pH of an emulsion to effect demulsification is taught in the patent art. Shashkin, for example, suggests the addition of petroleum sulfonaphthenic acids, Vostochnaya Neft, No. 5-6, P.55 (1940). Perkins describes the use of certain acidic compounds followed by electrostatic coalescence, U.S. Pat. No. 2,447,530. DeMering describes the use of sulfonated mineral oils, U.S. Pat. No. 2,209,445 and Wayne discloses the use of modified alkyd resins, U.S. Pat. No. 2,214,783. Blair proposes using malic anhydride resins in U.S. Pat. No. 2,216,310 and Bonnett in U.S. Pat. No. 2,260,798 discloses the use of picric acid and its derivatives. Sulfonated fatty acids are proposed by Tranoski and Uhlman in U.S. Pat. No. 2,269,134 and Barnickel, as early as 1914, recognized the use of modified fatty acids as demulsifiers, U.S. Pat. No. 1,467,831.

Techniques have been taught for the breaking of mineral and vegetable oils by changing in acidity brought about by mineral acids, see for example, Belgium Pat. No. 840,485. The breaking of an oil-in-water emulsion comprised of wool scouring waste with sulfuric acid, heat and filtration has been taught. Becher, Paul, Emulsions: Theory and Practice (Second Edition), Chapter 9, Reinhold Publishing Corp. (1965). This latter reference, in the same chapter, also discusses the treatment of oil field emulsions.

However, none of the prior art recognizes the unique properties of nitric acid utilizes in a demulsification scheme. Moreover, none of the prior art has recognized that the potential corrosive nature of the oil following its acid promoted demulsification. The present invention, by the application of a second step comprised of neutralization with demulsification completely eliminates any acidity in the oil caused by a mineral acid and the formation of another emulsion. Finally, the process of the present invention completely eliminates the necessity of having to process the middle phase emulsion of a surfactant produced crude oil separately to recover its oil because, this phase is essentially devoid of oil.

DISCLOSURE OF THE INVENTION

Oil is recovered simultaneously from all phases of a surfactant produced crude oil or simultaneously from the middle and upper phases of such an emulsion of acidizing the emulsion with a mineral acid. Following the acidation step, the oil is rendered relatively noncorrosive by the use of a neutralization step which incorporates a demulsifier to prevent the reformation of subsequent emulsions. The process of the present invention is useful in the demulsification of crude oil emulsions produced by surfactant floods utilized in secondary and tertiary oil recovery techniques. The invention is particularly beneficial in the treatment of such emulsions produced by micellar or micellar-polymer flooding of oil reservoirs.

The term micellar or micellar dispersion is intended to encompass flooding with systems of the type taught by H. J. Hill, J. Reisberg, and G. L. Stegemeier, J. Pet. Tech., 186 (Feb., 1973), wherein relatively dilute aqueous solutions of surfactant and/or cosurfactant are injected; the process of R. L. Reid, et al, in U.S. Pat. No. 3,885,628, wherein a multiphase system is injected; and U.S. Pat. No. 3,082,822 to L. W. Holm, et al, wherein substantially small slugs of anhydrous soluble oils are alternately injected with small slugs of water or other aqueous media; U.S. Pat. No. 3,682,247 to Jones; U.S. Pat. No. 3,687,201 to Son, et al; U.S. Pat. No. 3,740,343 to Jones, et al; U.S. Pat. No. 3,956,372 to Coleman, et al; U.S. Pat. No. 3,964,548 to Schroeder, et al; U.S. Pat. No. 3,997,451 to Plummer, et al; and U.S. Pat. No. 4,013,125 to Plummer, et al.

Oil produced from secondary or tertiary production may contain ionic surfactants, such as petroleum, crude oil, alkylaryl, or alkyl sulfonates; alkyl or aryl carboxylates; naturally occurring naphthenates or tetraalkylammonium salts; nonionic surfactants, such as polyoxyalkylated alcohols, phenols, or alkylated phenols, or alkylcarboxyamides; cosurfactants, such as alcohols, polyoxyalkylated alcohols or phenols, or alkyl sulfates; polymers, such as polyacrylamide or nonionic biopolymers; hydrocarbons such as crude oil, shale oil, coal liquification products, gas oils, or other petroleum fractions; and brine, containing inorganic cations from Groups IA and IIA and the transition metal series of the periodic table of the elements, and anions, such as a halide, sulfate, sulfite, carbonate, bicarbonate, nitrate, etc. The emulsions may also contain other compounds commonly used, such as biocides and anticorrosives.

The surfactant produced crude oil emulsion is demulsified by containing it with a mineral acid such as nitric acid, sulfuric acid or hydrochloric acid. Nitric acid is markedly superior to the other mineral acids for the demulsification of such emulsions, particularly crude oil emulsions resulting from a micellar flood. Specifically, the nitric acid gives faster separation rates and produces a clear brine containing less than about 0.05 volume percent oil. It dramatically reduces the volume of the middle phase emulsion and confines it to the oil-brine interface where it can be readily separated. Nitric acid also completely deoils the middle phase emulsion thereby eliminating its separate processing. The oil phase wil generally contain less than about 0.1 percent by volume water and will require significantly less neutralizer and demulsifier in the subsequent washing step then emulsions treated with other mineral acids.

The superiority of nitric acid as compared to other mineral acids is apparently due to its ability to function as an oxidizing agent as well as an acid. Sulfuric acid hydrochloric acids cannot play this additional role. Although it is not known for certain what is being oxidized it is thought that as an oxidizing agent, the nitric acid may alter the inorganic composition of the brine by oxidizing multivalent cations, e.g., Fe (II) to Fe (III) or selected anions, e.g., sulfite to sulfate. Alternatively or concurrently, it may oxidatively degrade the polymer's use for mobility control of the surfactant flood, e.g., polyacrylamide. Whatever its role, the nitric acid is highly beneficial toward the demulsification of surfactant produced crude oils and it is the preferred mineral acid of the present invention.

Hydrochloric and sulfuric acids can be used to demulsify surfactant produced crude oil emulsions. They accelerate the initial separation of the emulsion to give a three phase system. Unfortunately, neither of the acids give exceptionally good separation and sometimes a third phase containing oil is suspended in the brine. This makes the subsequent phase separation difficult and sometimes leads to the loss of oil. The oil phase obtained from the separation of the phases, however, is readily neutralized and demulsified, albeit sometimes requiring more chemical neutralizers and demulsifiers than does oil demulsified with nitric acid.

The oil obtained from the acidification usually contains less than about 5 percent by volume water and is of pipeline quality. Additionally, the oil is sufficiently dry that it does not readily reform an emulsion upon exposure to water. However, the oil phase does have an acidic character. The acidic character the oil is not entirely due to dissolved mineral acids. Potentiometric titration with a standard base reveals the presence of both strong and weak acids and the concentration of the latter is usually greater than the former. Although the weak acids have not been characterized, it is assumed that they are either naturally occurring surfactants, e.g., naphthenic acid, etc., orginally present in the produced fluids or hydrolyzed acrylamides, e.g., polyacrylic acid, from the mobility control agent. The strong acid break in the titration curve is undoubtedly due to residual amounts of mineral acid or sulfonic acids produced by protonation of the sulfonate. Thus, due to its acidic character, the oil can produce a corrosive environment and water which is utilized in the washing of the oil will obtain a similar pH. For example, if the aqueous phase in equilibrium with the demulsified oil has a pH of 3.0, subsequently washing the oil with water will produce a brine having a pH of about 3. Therefore, it is usually desirable to neutralize the brine, which is in equilibrium with the oil, to obtain a pH of about 7.0 to about 9.0, which results in a relatively non-corrosive oil.

The neutralization consists of water washing of the acid-treated oil with organic or inorganic bases which renders the acidic components water soluble. This step, although seemingly quite simple, can result in the formation of a secondary emulsion if the proper bases are not employed. Organic neutralizers are preferred since they are nonionic. Preferred organic neutralizers are water-soluble amines, such as the alkanol amines or morpholine and its derivatives. Alkanol amines such as monol-, di-, and tri-ethanolamine or mono-, di-, or tri-2- hydroxypropylamine are useful. Morpholine derivatives, including N-2-hydroxyethylmorpholine and N-2-aminoethylmorpholine as well as the parent compound are useful. Also of utility are low molecular weight polyalkyloxyamines, such as Jeffamines D-230 and D-400.

In order to prevent the reformation of an emulsion during the neutralization step caused by increase in pH and to increase the rate of separation between the oil and other phases resulting from the water wash, demulsifiers are utilized in a neutralization step. Particularly preferred demulsifiers for use in the neutralization step are the polyalkyloxyamines taught in my co-pending application, "Polyalkyloxyamines as Demulsifying Agents", Ser. No. 272,454 filed concurrently herewith and described hereinafter. Of particular utility are the higher molecular weight derivatives such as Jeffamines D-2000, BUD-2000 and DU-3000, described hereinafter. Somewhat less effective demulsifiers which can be utilized in the washing (neutralization) step include conventional type demulsifiers such as Tretolite RP-578 or Nalco SRE-467.

The most preferred amines for either forming an amine salt of the carboxylic acid or for demulsification of an acid or aqueous wash of the oil after hydrolysis are polyalkyloxyamines are defined in formula I.

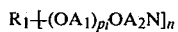
(I)

where $R_1$ is hydrogen, or an alkyl, aryl, or alkylaryl group, or a heterocyclic group. The alkeneoxy group, $-OA_1-$, is derived from an alkylene oxide such as ethylene oxide, propylene oxide, butylene oxide, 2-butylene oxide, isobutylene oxide and the like, such as:

| | |
|---|---|
| $-CH_2-CH_2-O-$ | ethyleneoxy |
| $CH_3-CH_2-CH_2-O-$ | propyleneoxy |
| $\begin{array}{c} CH_3 \\ | \\ -CH_2-CH_2-O- \end{array}$ | 2-propyleneoxy |
| $CH_2-CH_2-CH_2-CH_2-O$ | butyleneoxy |
| $\begin{array}{c} CH_3 \\ | \\ CH_2 \\ | \\ -CH_2-CH-O \end{array}$ | 2-butyleneoxy |
| $\begin{array}{c} CH_3\ CH_3 \\ |\ \ \ | \\ -CH-CH-O- \end{array}$ | 2-butyleneoxy |
| $\begin{array}{c} CH_3 \\ | \\ -CH_2-CH-O- \\ | \\ CH_3 \end{array}$ | isobutyleneoxy | and $-OA_2N$ is a nitrogen-containing alkyleneoxy group such as:

| | |
|---|---|
| $\begin{array}{c} CH_3 \\ | \\ -O-CH_2-CH-NH_2 \end{array}$ | 2-aminopropyleneoxy |
| $-O-CH_2-CH_2-CH_2-NH_2$ | 3-aminopropyleneoxy |
| $\begin{array}{c} CH_3 \\ | \\ -O-CH_2-CH-NH-CH_3 \end{array}$ | 2-(methylamino)-propyleneoxy |
| $\begin{array}{c} CH_3 \\ | \\ -O-CH_2CH-N-(CH_3)_2 \end{array}$ | 2-(dimethylamino)-propyleneoxy |
| $\begin{array}{c} CH_3 \\ | \\ -O-CH_2-CH-NH-CH_2-CH_2-CH_2-NH_2 \end{array}$ | 2-(cyanoethylamino)-propyleneoxy |
| $\begin{array}{c} CH_3\ \ \ \ \ CH_2-CH_2 \\ |\ \ \ \ \ \ \ \ /\ \ \ \ \ \ \ \ \backslash \\ -O-CH_2-CH-N\ \ \ \ \ \ \ \ \ \ \ O \\ \ \ \ \ \ \ \ \ \ \ \ \ \ \ \ \ \ \ \backslash\ \ \ \ \ \ \ \ / \\ \ \ \ \ \ \ \ \ \ \ \ \ \ \ \ \ CH_2-CH_2 \end{array}$ | 2-(N-morpholyl)-propyleneoxy |
| $\begin{array}{c} CH_3\ \ \ \ \ CH=N \\ |\ \ \ \ \ \ \ \ / \\ -O-CH_2-CH-N\ \ \ \ \ \ \ | \\ \ \ \ \ \ \ \ \ \ \ \ \ \ \ \ \ \ \ \backslash \\ \ \ \ \ \ \ \ \ \ \ \ \ \ \ \ \ CH=CH \end{array}$ | 2-(N-imidazolyl)-propyleneoxy |
| $\begin{array}{c} CH_3\ \ \ \ \ O \\ |\ \ \ \ \ \ \ \ \| \\ -O-CH_2-CH-NH-C-NH_2 \end{array}$ | 2-(ureido)propyleneoxy |
| $\begin{array}{c} CH_3 \\ | \\ -O-CH_2-CH-NH-CH_2-CH_2-OH \end{array}$ | 2-(hydroxyethylamino)-propyleneoxy |
| $-O-CH_2-CH_2-NH_2$ | aminoethyleneoxy |
| $\begin{array}{c} CH_3 \\ | \\ CH_2 \\ | \\ -O-CH_2-CH-NH_2 \end{array}$ | 2-amino-1-butyleneoxy |

-continued

| | |
|---|---|
| $\quad\quad\quad CH_3$<br>$\|$<br>$-O-CH_2-CH-N+CH_2-CH_2-OH)_2$ | 2-[bis(hydroxyethyl)]-<br>aminopropyleneoxy; |

$A_1$ and $A_2$ may be the same or different alkyls;

n is an integer having a value of at least one which denotes the number of $-OA_1OA_2N$ groups attached to $R_1$;

p is zero or an integer denoting the number of $+OA_1+$ units in each of the n groups attached to $R_1$; and i is a subscript for distinguishing between the individual p's in each of the n groups attached to $R_1$.

Some commercially available compounds that belong to formula I are shown in Table I along with their corresponding tradenames. These are produced by the Jefferson Chemical Co., a subsidiary of Texaco, Inc. The number contained within the name of the Jeffamine is indicative of that particular compound's average molecular weight.

TABLE 1

| Tradename | $R_1$ | $+OA_1+$ | $-OA_2N$ | n | p |
|---|---|---|---|---|---|
| Jeffamine T-403 | 1,1,1-trimethylenepropane | propyleneoxy | 2-aminopropyleneoxy | 3 | 0.75 |
| Jeffamine TA-345 | 1,2-propenyl | propyleneoxy | 3-aminopropenyloxy | 2 | 0.8 |
| Jeffamine D-230 | 1,2-propenyl | propyleneoxy | 2-aminopropyleneoxy | 2 | 0.8 |
| Jeffamine D-400 | 1,2-propenyl | propyleneoxy | 2-aminopropyleneoxy | 2 | 2.3 |
| Jeffamine D-2000 | 1,2-propenyl | propyleneoxy | 2-aminopropyleneoxy | 2 | 16.1 |
| Jeffamine ED-600 | 1,2-ethenyl | ethyleneoxy | 2-aminopropyleneoxy | 2 | 6.3 |
| Jeffamine ED-900 | 1,2-ethenyl | ethyleneoxy | 2-aminopropyleneoxy | 2 | 9.7 |
| Jeffamine ED-2001 | 1,2-ethenyl | ethyleneoxy | 2-aminopropyleneoxy | 2 | 22 |
| Jeffamine BUD-2000 | 1,2-propenyl | propyleneoxy | 2-uredylpropyleneoxy | 2 | 14.8 |
| Jeffamine DU-700 | 1,2-propenyl$^a$ | propyleneoxy | 2-uredylpropyleneoxy | 2 | 3.6 |
| Jeffamine DU-1700 | 1,2-propenyl$^a$ | propyleneoxy | 2-uredylpropyleneoxy | 2 | 12.2 |
| Jeffamine DU-3000 | 1,2-propenyl$^a$ | propyleneoxy | 2-uredylpropyleneoxy | 2 | 23.5 |
| Jeffamine 5060-47-B | 1,1,1,1-tetramethylene methane | propyleneoxy | 2-aminopropyleneoxy | 4 | not known |

$^a$The DU series compounds also contain internal urea linkages.

Figure 1:
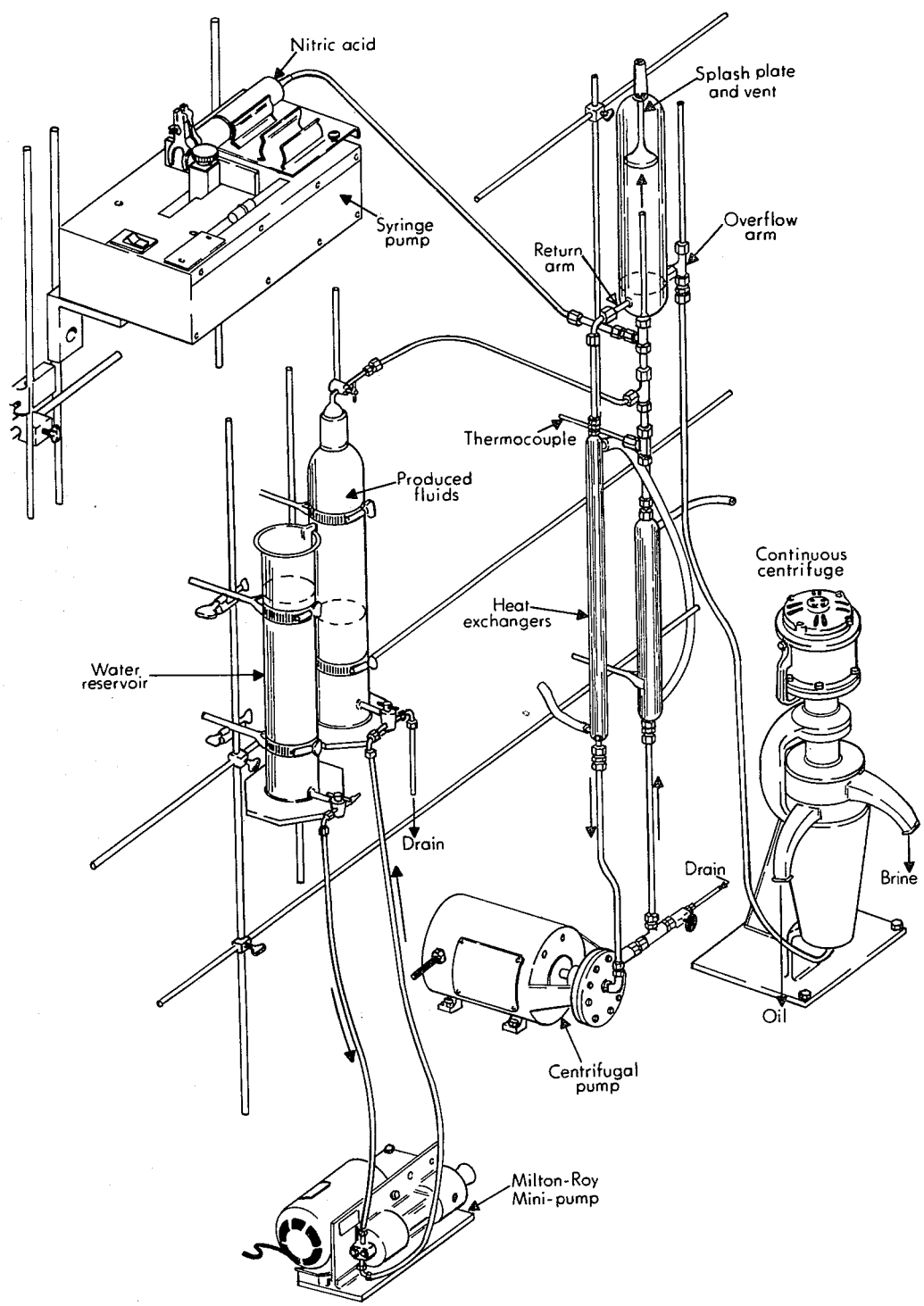
FIG. 1 is a schematic representation of the process utilized in Example 1.

PREFERRED MODES FOR CARRYING OUT THE INVENTION:

Demulsification with mineral acids occurs at temperatures as low as 4° C. However, at these temperatures, mixing is usually difficult because of the viscosity of the fluid and the resulting separations are not good. The preferred temperatures lie between about 37° C. and about 94° C. and more preferably between about 60° C. and about 77° C. In order to take full benefit of the mild oxidizing power of the nitric acid, the temperature should be above 100° F. when nitric acid is utilized as the mineral acid. Additionally, temperatures of from about 37° C. to about 94° C., irrespective of the mineral acid, are also preferred for the neutralization step to accelerate the separations and improve the solubility of the sulfonates in the aqueous phase.

Sufficient mineral acids should be added to the surfactant produced fluid to give a pH of 6 or lower in the brine phase. Preferably, the pH should be below 5 and most preferably below 4. If the brine is separated from the oil and emulsion prior to acidification, as it is in the examples of the present invention, the amount of mineral acid required to reach the preferred pH ranges will be between about 0.05 and about 0.50 weight percent. If the entire surfactant produced fluid stream is processed, considerably more acid is required to acidify the entire brine phase.

When nitric acid is used as the demulsifier, the concentration, based upon volume of oil, should be above about 0.10 volume percent and preferably between about 0.20 and about 0.95 volume percent to take advantage of its oxidizing nature.

The average residence time in a continuous reactor, or reaction time in a batch process, is preferably between about 0.10 and about 10 hours. More preferably, the residence time is between about 0.20 and about 6 hours and most preferably between about 0.50 and about 3 hours. When nitric acid is used, the reaction time should be at least 0.5 hours to fully utilize this oxidizing potential. It is preferred that the mineral acid demulsification step be conducted in conjunction with continuous centrifugation so that the oil brine will, for all practical purposes, be quantitatively separated from the deoiled middle phase emulsion.

EXAMPLES

The crude oil emulsions used to establish the effectiveness of the process of the present invention were obtained from a micellar-polymer flooding of a sandstone oil reservoir located in Crawford County, Illinois. The reservoir had been previously water flooded. Crude oil sulfonates produced by sulfonating Illinois crude oil followed by neutralizing with ammonia were used as a surfactant in the flood and the cosurfactant utilized in the flood were alcohols or ethoxylated alcohols.

The floods were conducted by introducing 10 percent of a pore volume of a micellar-dispersion slug containing about 2.5 weight percent of active sulfonate groups (ASG=$-SO_3NH_4$), about 0.5–1.5 weight percent cosurfactant, about 5–15 weight percent crude oil and other hydrocarbons, about 2.0–4.0 weight percent of a mixture of inorganic salts, predominantly ammonium sulfate and ammonium sulfite and the remainder water. The slug was followed by a 10 percent of a pore volume of about 1200 ppm polyacrylamide in water, then by less concentrated solutions of the acrylamide polymer, and finally water.

Samples of produced fluids from the sandstone reservoir, previously mentioned, were taken at a time when they had an oil cut of about 20 percent. The fluids, prior to the addition of demulsifying chemicals, were allowed to stand quiescently for 24 hours; the clear brine phase was then separated. The remaining black fluid, containing at least two phases, including the upper phase emulsion and middle phase emulsion, was then used as the crude oil emulsion in Examples 1-4.

In several examples, a simulated desalter test was utilized to evaluate the quality of the oil recovered after demulsification. The simulated desalter test consists of mixing in a blender for 30 seconds, 100 milliliters (ml) of the demulsified oil with 5.0 ml of water and a demulsifier in an amount which is typically used at a refinery. The mixture is then transferred to a calibrated tube and heated to a temperature of from about 71°-94° C. or, if possible, to the actual desalter temperature. After 15 minutes, the amount of water that has separated is read and recorded as "before coalescence" and is reported in the examples as "BC".

The sample is then remixed, heated again to the desalter temperature, and subjected to electrostatic coalescence for a period of 15 minutes applying a current gradient similar to that of the refinery desalter. The rate at which the oil dehydrates is determined by visually reading every 5 minutes the water that separates. These values are recorded using plus and minus signs to indicate slightly more or less than the graduation on the tube.

After the electrostatic coalescence, qualitative comments are recorded as to the clarity and color of the water and whether or not a third phase exists at the oil-water interface.

The water content of the oil phase is then determined by the Karl Fischer method and recorded. Values below about 0.7 percent indicate that the oil will present no problems in the refinery.

The centrifuge test reported in some of the examples was conducted by mixing in a blender for 30 seconds, 100 ml of oil and 5.0 ml of water at 21°-27° C. and then centrifuging for 15 minutes. The amount of water separated is then recorded as well as comments about its color and clarity. The oil-water interface was also examined for the presence of a third phase. The water content of the oil phase is determined by the Karl Fischer method. Values below about 0.7 volume percent indicate that the oil is pipeline quality.

EXAMPLE I

Refering to FIG. 1, the above described produced fluids were charged at a constant rate to a continuous reactor by water displacement using a Milton-Roy Mini-pump. The reactor consists of a circulating loop powered by a centrifugal pump. Fluid from the pump is driven against a splashplate after which it falls into a reservoir which serves as the suction head for the centrifugal pump. Complete emulsification of the multiphase system is maintained in the reactor due to the action of the centrifugal pump and the rapid circulation of the fluid. Level control in the splashplate reservoir is controlled by the height of the tube in the level control arm. Residence time is controlled by the rate of the level control arm. Residence time is controlled by the rate of addition of the produced fluids and the amount of fluid maintained in the reactor.

Mineral acid is charged to the circulating loop of the reactor at a constant rate by a syringe pump. The temperature in the reactor is controlled by the circulating fluid in the heat exchangers and recorded by a thermocouple immersed in the circulating fluid.

Reactor fluid from the level control arm flows by gravity into a continuous centrifuge (Sharples Model T-1) where the oil and brine are continuously separated. Material balances through the reactor are above 95 percent. Table 2 shows the conditions, namely, residence time, temperature, mineral acid concentration, etc., from which the oil was derived for neutralization and demulsification. In the Sample 3 run, the reactor fluid was allowed to separate without the aid of the centrifuge.

TABLE 2

| | Continuous Nitric Acid Demulsification | | | |
|---|---|---|---|---|
| Sample | HNO₃ % | Residence Temperature | Temp. °C. | Centrifuge |
| 1 | 0.93 | 1.0 | — | yes |
| 2 | 0.93 | 1.0 | 65 | yes |
| 3 | 0.24 | 1.0 | 65 | no |
| 4 | 0.93 | 1.0 | 65 | yes |
| 5 | 0.48 | 1.0 | 65 | yes |
| 6 | 0.45 | 1.0 | 65 | yes |
| 7 | 0.48 | 1.0 | 65 | yes |
| 8 | 0.48 | 1.0 | 65 | yes |

EXAMPLE II

Oil, from Example I (200 ml) was mixed in a blender with the appropriate amount of water and the quantities of neutralizers and demulsifiers shown in Tables 3 and 4. The mixtures were then transferred to separatory funnels and warmed to 37° C. after which the aqueous phase was separated and the pH recorded. The desalter test was then run on the oil phase. The results from organic base neutralization are shown in Table 3 and those from inorganic base neutralization in Table 4.

TABLE 3

| | Neutralization of Mineral Acid-Treated Oil with Organic Bases | | | | | | | | | | |
|---|---|---|---|---|---|---|---|---|---|---|---|
| | Neutralization | | | | Desalter Test | | | | | | |
| | | | | | Coalescence Time, min. | | | | Water | Interface | Water-in Oil, % |
| Sample | Organic Base (ppm) | Demulsifier (ppm) | H₂O % | pH | BC | 5 | 10 | 15 | Quality | Quality | Before / After |
| 1 | Jeffamine D-400(3500) | — | 100 | 8.2 | 0 | 3+ | 5+ | 5+ | clear | no 3rd phase | 0.40 / 0.50 |
| 2 | (1) Jeffamine D-230(2500) | — | 50 | 8.7 | | | | | | | |
| | (2) — | — | 50 | — | 0 | 5+ | 6 | 6 | tan | trace 3rd phase | — / 0.44 |
| 3 | Jefferson Amine C-6 (6000) | Jeffamine D-2000(1600) | 75 | 9.8 | 4— | 5+ | 6— | 6— | clear | no 3rd phase | 0.10 / 0.58 |
| 4 | Triethanol Amine(200) | Jeffamine D-2000(1250) | 50 | 9.4 | 4— | 5+ | 5+ | 6— | clear | no 3rd phase | 0.16 / 0.33 |
| 5 | (1)Triethanol | Jeffamine | 50 | 6.9 | | | | | | | |

TABLE 3-continued

Neutralization of Mineral Acid-Treated Oil with Organic Bases

| | | | | | Desalter Test | | | | | | |
|---|---|---|---|---|---|---|---|---|---|---|---|
| | Neutralization | | | | Coalescence Time, min. | | | Water | Interface | Water-in Oil, % | |
| Sample | Organic Base (ppm) | Demulsifier (ppm) | H$_2$O % | pH | BC | 5 | 10 | 15 | Quality | Quality | Before | After |
| | Amine(1500) (2)Triethanol Amine(500) | D-2000(1000) | 50 | 7.7 | 4— | 5+ | 5+ | 6— | clear | no 3rd phase | 0.13 | 0.46 |
| 6 | Monoethanol Amine(1000) | — | 25 | 9.4 | 4— | 5— | 5— | 5+ | clear | no 3rd phase | 0.04 | 0.48 |
| 7 | Diethanol Amine(1000) | — | 25 | 8.2 | 2+ | 4 | 5— | 5— | clear | no 3rd phase | 0.02 | 0.33 |
| 8 | Diethanol Amine(2000) | Jeffamine D-2000(1000) | 50 | 9.8 | 1 | 3 | 4 | 5 | clear yellow | no 3rd phase | 0.11 | 0.59 |

TABLE 4

Neutralization of Nitric Acid-Treated Oil with Sodium Bicarbonate

| | Treatment | | | | Desalter Test | | | | | | | |
|---|---|---|---|---|---|---|---|---|---|---|---|---|
| | | Demulsifier | | | Electrostatic Coalescence Time, min. | | | | Water | Interface | Water-in-oil, % | |
| Sample | NaHCO$_3$(ppm) | (ppm) | H$_2$O, % | pH | BC | 5 | 10 | 15 | Quality | Quality | Before | After |
| 1 | 1250 | Nalco 8RE-467(5000) | 25 | 7.9 | 4+ | 4 | 4+ | 5 | good | no 3rd phase | 0.50 | 0.29 |
| 2 | 1250 | Nalco 103(500) | 25 | 7.4 | 4+ | 4+ | 5 | 5 | good | no 3rd phase | 0.04 | 0.38 |
| 3 | 2500 | Nalco 8RE-467(500) | 25 | 7.9 | 4+ | 5 | 5 | 5+ | good | trace 3rd phase | 0.06 | 0.40 |
| 4 | (1) 5000 | Jeffamine D-2000(1250) | 100 | 8.0 | | | | | | | | |
| | (2) — | Jeffamine D-3000(500) | 50 | — | 0 | 6— | 6 | 6 | light brown | trace 3rd phase | 0.21 | 0.16 |
| 5 | (1) 10,000 | Jeffamine D-2000(2500) | 100 | 7 | | | | | | | | |
| | (2) — | Jeffamine D-400(1000) | 50 | 7 | 1— | 4+ | 5+ | 6— | light brown | trace 3rd phase | 0.13 | 0.32 |

EXAMPLE III

Samples of the previously described fluids produced by the micellar-polymer flood (500 gm) were blended for 60 seconds with water (250 gm) and 96 percent sulfuric acid (1000 ml) and then allowed to separate. The brine, having a pH of about 0.5 and a third phase present at the oil-water interface were then separated and discarded.

The oil phase (200 ml) was washed with 100 ml of water, 4000 ml of Jefferson Amine C-6 and 200 ml of Jeffamine D-2000. The resulting separation was fast and gave an amber translucent brine with a pH of 10.7. Jefferson Amine C-6 is a mixture of amines marketed by the Jefferson Chemical Company, a subsidiary of Texaco. Its principal ingredients are aminoethoxyethylmorpholine and hydroxyethoxyethylmorpholine.

In a like manner, the oil phase (200 ml) was washed with 200 ml of 0.5 percent sodium bicarbonate and 200 ml of Jeffamine D-2000. The resulting separation was slow giving a tan, opaque brine with a pH of 8.3.

The brine and third phase present at the oil-water interface were separated from both experiments and the oil subjected to the centrifuge test, the results of which are presented in Table 5.

TABLE 5

Centrifuge Test of Sulfuric Acid Demulsified Emulsion

| Sample | Neutralizer (ppm) | Demulsifier (ppm) | Brine pH | Water Quality | Interface Quality | H$_2$O, % |
|---|---|---|---|---|---|---|
| 1 | Amine C-6 (20000) | D-2000(1000) | 10.8 | tan, opaque | no 3rd phase | 0.13 |
| 2 | NaHCO$_3$ (1000) | D-2000(1000) | 8.2 | amber, clear | trace 3rd phase | 0.15 |

EXAMPLE IV

Samples of the previously described fluids produced by the micellar-polymer flood (500 gm) were blended for 60 seconds with water (250 gm) and 36 percent hydrochloric acid (1000 ml) and then allowed to separate. The brine (pH=1.8) and a third phase present at the oilwater interface were then separated and discarded.

The oil phase (200 ml) was washed with 100 ml of water, 4000 ml of Jefferson Amine C-6, and 200 ml of Jeffamine D-2000. The resulting separation was fast and gave a brown, opaque brine phase with a pH of 10.8.

In a like manner, the oil phase (200 ml) was washed with 200 ml of 0.5 percent sodium bicarbonate and 200 ml of Jeffamine D-2000. The resulting separation was slow giving a tan, opaque brine phase with a pH of 8.2.

Each of the neutralized and demulsified oil phases was subjected to the centrifuge test, the results of which are presented in Table 6.

TABLE 6

Centrifuge Test of Hydrochloric Acid Demulsified Emulsion

| Sample | Neutralizer (ppm) | Demulsifier (ppm) | Brine pH | Water Quality | Interface Quality | H$_2$O, % |
|---|---|---|---|---|---|---|
| 1 | Amine C-6 (20000) | D-2000(1000) | 10.8 | tan, opaque | trace 3rd phase | 0.10 |
| 2 | NaHCO$_3$ (1000) | D-2000(1000) | 8.2 | amber, clear | trace 3rd phase | 0.16 |

What is claimed is:

1. A process for the demulsification of emulsions contained in a surfactant produced crude oil emulsion comprising:
   contacting the surfactant produced crude oil emulsion for a time period of from about 0.01 to about 10 hours at a temperature of between about 37° C. to about 94° C. with an amount of nitric acid sufficient to give the mixture a pH of less than about 6 to cause the demulsification of the crude oil emulsion.

2. The process of claim 1 wherein an oil phase caused by the demulsification is separated and recovered from the other phases caused by the demulsification.

3. The process of claim 1 wherein the surfactant produced crude oil emulsion is produced by a micellar flood of an oil-containing hydrocarbon reservoir.

4. A process for the demulsification of emulsion phases contained in a surfactant produced crude oil emulsion comprising:
   (a) contacting the surfactant produced crude oil emulsion for a time period of from about 0.01 to about 10 hours at a temperature of between about 37° C. to about 94° C. with a mineral acid selected from the group consisting of nitric acid, sulfuric acid and hydrochloric acid in an amount sufficient to give the mixture a pH of less than about 6;
   (b) separating the oil phase from the phases caused by the demulsification of step (a); and
   (c) neutralizing the oil phase by contacting the oil phase with an inorganic base selected from the group consisting of sodium bicarbonate and alkali metal hydroxides or a non-ionic, water-soluble amine base in an amount sufficient to raise the pH to at least about 7, and wherein the base utilized for neutralization does not have demulsifying properties, conducting the neutralization step in the presence of an amine-containing demulsifier;
   (d) allowing the mixture of step (c) to separate into at least two phases, one of which is an oil phase; and
   (e) separating the oil phase from the other phases present.

5. The process of claim 4 wherein the base utilized in the neutralization step is selected from the group consisting of sodium bicarbonate, alkali metal hydroxides, mono-, di- and tri-ethanolamines, mono-, di- and tri-2-hydroxypropylamines and polyalkyloxyamines wherein the polyalkyloxyamine is of the formula:

$$R_1-[-(OA_1)_{pi}OA_2N]_n$$

wherein;
   $R_1$ is selected from the group consisting of hydrogen, an alkyl, an aryl, an alkylaryl, a heterocyclic and N,N'diurea;
   (OA$_1$) is an alkyleneoxy substituent;
   —OA$_2$N is a nitrogen-containing alkyleneoxy group;
   n is an integer having a value of at least 1 which denotes the number of —OA$_1$OA$_2$N groups attached to R$_1$;
   p is 0 or an integer denoting the number of -(OA$_1$)- units in each of the n groups attached to R$_1$; and
   i is a subscript which distinguishes between the individual p groups of each of the n groups.

6. The process of claim 5 wherein the base is selected from the group consisting of sodium bicarbonate, alkali metal hydroxides and mono-, di and tri- ethanolamines and the neutralization step utilizes said polyalkyloxyamine demulsifier.

7. The process of claim 5 or claim 6 wherein the mineral acid is utilized in an amount sufficient to give the mixture of step (a) a pH of less than about 4, wherein step (a) is conducted at a temperature of between about 60° C. and 77° C. for a time period of from about 0.20 hours to about 6 hours and wherein the neutralization step is conducted at a temperature of from about 37° C. to about 94° C.

8. The process of claim 5 wherein R$_1$ is selected from the group consisting of an alkyl, N,N'-diurea, -(OA$_1$)- and -(OA$_2$)- are each a substituent selected from the group consisting of ethyleneoxy, propyleneoxys and butyleneoxys and N is a nitrogen-containing substituent selected from the group consisting of amine, methylamine, dimethylamine, cyanoethylamine, morpholine, imidazole, ureide and hydroxyethylamine.

9. The process of claim 5 or claim 8 wherein n is a value of from 1 to 4, the average number of -(OA$_1$)- groups per polyalkyloxyamine is from 0 to about 35 and wherein the polyalkyloxyamine has an average molecular weight of from about 200 to about 3500.

10. The process of claim 8 wherein R$_1$ is 1,1,1-trimethylene methane, -(OA$_1$)- and -(OA$_2$)- are each 2-propyleneoxy, N is a nitrogen-containing substituent which is an amine, n is 3, the average number of -(OA$_1$)- groups in the polyalkyloxyamine is from about 0.75 to about 2.5 and the average molecular weight of the polyalkyloxyamine is from about 200 to about 400.

11. The process of claim 8 wherein R$_1$ is 1,2-propenyl, -(OA$_1$)- and -(OA$_2$)- are each 2-propyleneoxy, N is a secondary amine, n is 2, the average number of -(OA$_1$)- groups in the demulsification compound is from about 0.8 to about 16 and the average molecular weight of the demulsification compound is from about 230 to about 2000.

* * * * *

UNITED STATES PATENT AND TRADEMARK OFFICE
CERTIFICATE OF CORRECTION

PATENT NO. : 4,396,530  Page 1 of 2
DATED : August 2, 1983
INVENTOR(S) : Roy B. Duke It is certified that error appears in the above-identified patent and that said Letters Patent are hereby corrected as shown below:

| | |
|---|---|
| Col. 2, line 5: | After toward, delete "toward". |
| Col. 2, line 6: | Delete "and" and insert --an--. |
| Col. 2, line 10: | Delete "phase". |
| Col. 2, line 63: | Delete "utilizes" and insert --utilized--. |
| Col. 2, line 65: | Delete "that". |
| Col. 3, line 57: | Delete "containing" and insert --contacting--. |
| Col. 4, line 1: | Delete "wil" and insert --will--. |
| Col. 4, line 4: | Delete "then" and insert --than--. |
| Col. 4, line 7: | After Sulfuric, delete "acid" and insert --and--. |
| Col. 4, line 37: | After character, 2nd occurrence insert --of--. |
| Col. 4, line 68: | Delete "monol-" and insert --mono- --. |
| Col. 5, line 27: | Delete and insert the following: $$R_1\text{-}[(OA_1)_{\overline{P_i}}\text{-}OA_2N]_n \qquad (I)$$ |
| Col. 6, line 3: | Delete "-OA$_1$-," and insert -- -(OA$_1$)-, --. |
| Col. 7, lines 9 & 10: | Delete indention on both lines. |
| Col. 7, line 54: | Delete "100°F" and insert --37°C--. |
| Col. 8, line 51: | Delete "cosurfactant" and insert --cosurfactants--. |
| Col. 9, line 48: | Delete "Refering" and insert --Referring--. |

UNITED STATES PATENT AND TRADEMARK OFFICE
CERTIFICATE OF CORRECTION

PATENT NO. : 4,396,530  
DATED : August 2, 1983  
INVENTOR(S) : Roy B. Duke

Page 2 of 2

It is certified that error appears in the above-identified patent and that said Letters Patent are hereby corrected as shown below:

Col. 11, line 44: Delete "were" and insert --was--.  
Col. 12, line 56: Delete "oilwater" and insert --oil-water--.  
Col. 14, line 3: Delete and insert the following:
$$R_1-[(OA_1)_{\overline{P_i}}-OA_2N]_n$$

Signed and Sealed this

Twenty-ninth Day of November 1983

[SEAL]

Attest:

GERALD J. MOSSINGHOFF

Attesting Officer — Commissioner of Patents and Trademarks